United States Patent
Huang

(10) Patent No.: US 9,116,308 B2
(45) Date of Patent: Aug. 25, 2015

(54) OPTICAL FIBER CONNECTOR HAVING CLAMPING ELEMENT

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 12 days.

(21) Appl. No.: 14/093,724

(22) Filed: Dec. 2, 2013

(65) Prior Publication Data

US 2015/0093077 A1  Apr. 2, 2015

(30) Foreign Application Priority Data

Sep. 30, 2013  (TW) .............................. 102135236 U

(51) Int. Cl.
*G02B 6/38* (2006.01)
*G02B 6/36* (2006.01)

(52) U.S. Cl.
CPC ............ *G02B 6/3807* (2013.01); *G02B 6/3636* (2013.01); *G02B 6/3652* (2013.01); *G02B 6/3839* (2013.01)

(58) Field of Classification Search
None
See application file for complete search history.

(56) References Cited

U.S. PATENT DOCUMENTS

| | | | | |
|---|---|---|---|---|
| 5,005,941 | A * | 4/1991 | Barlow et al. ................. | 385/135 |
| 5,471,555 | A * | 11/1995 | Braga et al. ................... | 385/136 |
| 6,062,740 | A * | 5/2000 | Ohtsuka et al. ................. | 385/81 |
| 6,132,105 | A * | 10/2000 | Konda et al. .................... | 385/65 |
| 6,491,442 | B1 * | 12/2002 | Murakami et al. .............. | 385/58 |
| 6,571,048 | B1 * | 5/2003 | Bechamps et al. ............ | 385/136 |
| 6,592,266 | B1 * | 7/2003 | Hankins et al. ................. | 385/53 |
| 2002/0191922 | A1 * | 12/2002 | Goto et al. ....................... | 385/94 |
| 2003/0026554 | A1 * | 2/2003 | Jin et al. .......................... | 385/89 |
| 2003/0091317 | A1 * | 5/2003 | Schlueter et al. ............. | 385/137 |
| 2004/0057672 | A1 * | 3/2004 | Doss et al. ....................... | 385/76 |
| 2010/0266245 | A1 * | 10/2010 | Sabo ............................... | 385/79 |
| 2011/0064357 | A1 * | 3/2011 | Chang ............................. | 385/33 |
| 2011/0176774 | A1 * | 7/2011 | Barnes et al. ................... | 385/56 |
| 2012/0251052 | A1 * | 10/2012 | Hsu ................................. | 385/74 |
| 2014/0086538 | A1 * | 3/2014 | Kuo ................................ | 385/89 |
| 2015/0023634 | A1 * | 1/2015 | Huang ............................ | 385/77 |

FOREIGN PATENT DOCUMENTS

JP  8-292344 A * 11/1996 .............. G02B 6/40

* cited by examiner

*Primary Examiner* — Mike Stahl
(74) *Attorney, Agent, or Firm* — Novak Druce Connolly Bove + Quigg LLP

(57) ABSTRACT

An optical fiber connector includes a housing and a clamping element. The housing defines a receiving space including an inner bottom surface. The inner bottom surface defines first grooves and first receiving grooves aligned with the first grooves, and includes two clamping holes. The clamping element is received in the receiving space and includes a cantilever beam and two hooks extending from the cantilever beam. The cantilever beam includes a bottom surface defining a second receiving grooves. The two hooks are received into the two clamping holes to fix the clamping element to the housing. The first receiving grooves and the second receiving grooves cooperatively define receiving holes to receive optical fibers.

8 Claims, 5 Drawing Sheets

OPTICAL FIBER CONNECTOR HAVING CLAMPING ELEMENT

BACKGROUND

1. Technical Field

The present disclosure relates to an optical fiber connector.

2. Description of Related Art

An optical fiber connector includes a housing and optical fibers. The housing includes an optical surface and defines grooves and receiving holes through the optical surface. The grooves communicate with the receiving holes. The optical fibers are received in the grooves with one end received in the receiving holes. The receiving holes have small diameters, such as 0.126 millimeters, so it is difficult to clean and remove debris. Thus, transmission efficiency of the optical fiber connector may be reduced.

Therefore, it is desirable to provide an optical fiber connector to overcome the shortcomings mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
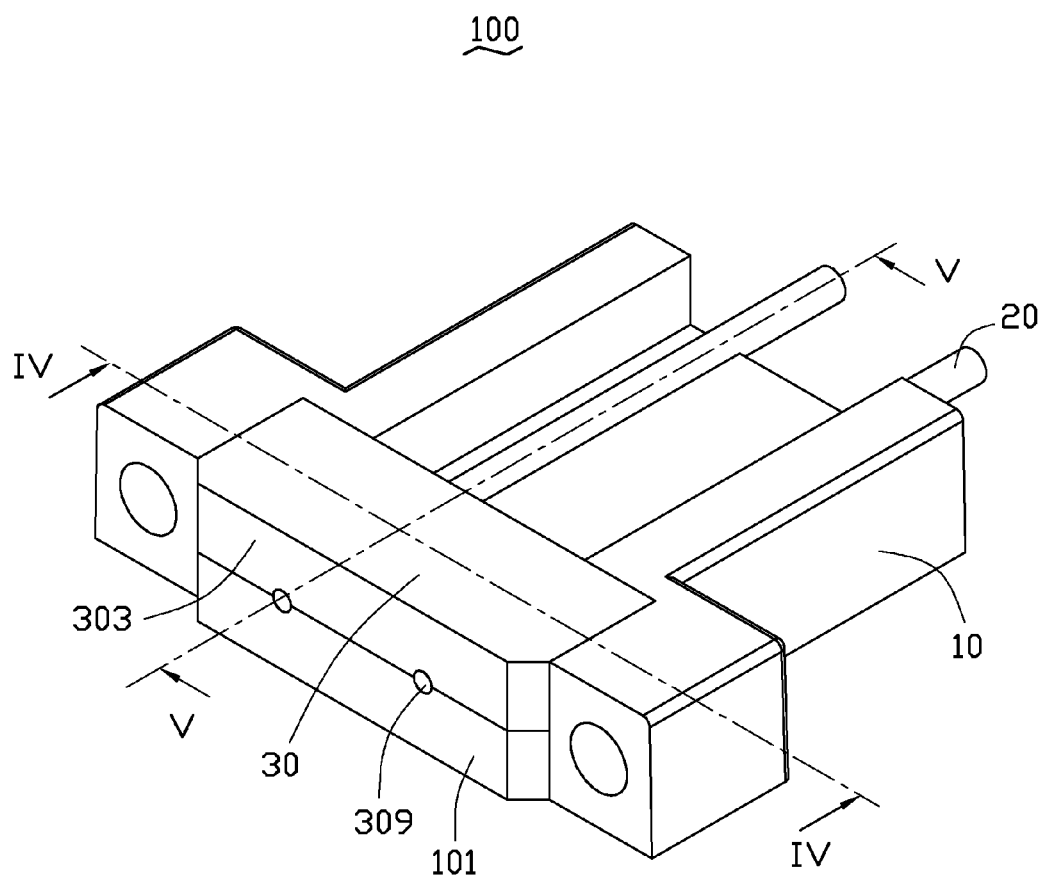
FIG. 1 is a schematic, isometric view of an embodiment of an optical fiber connector.
Figure 2:
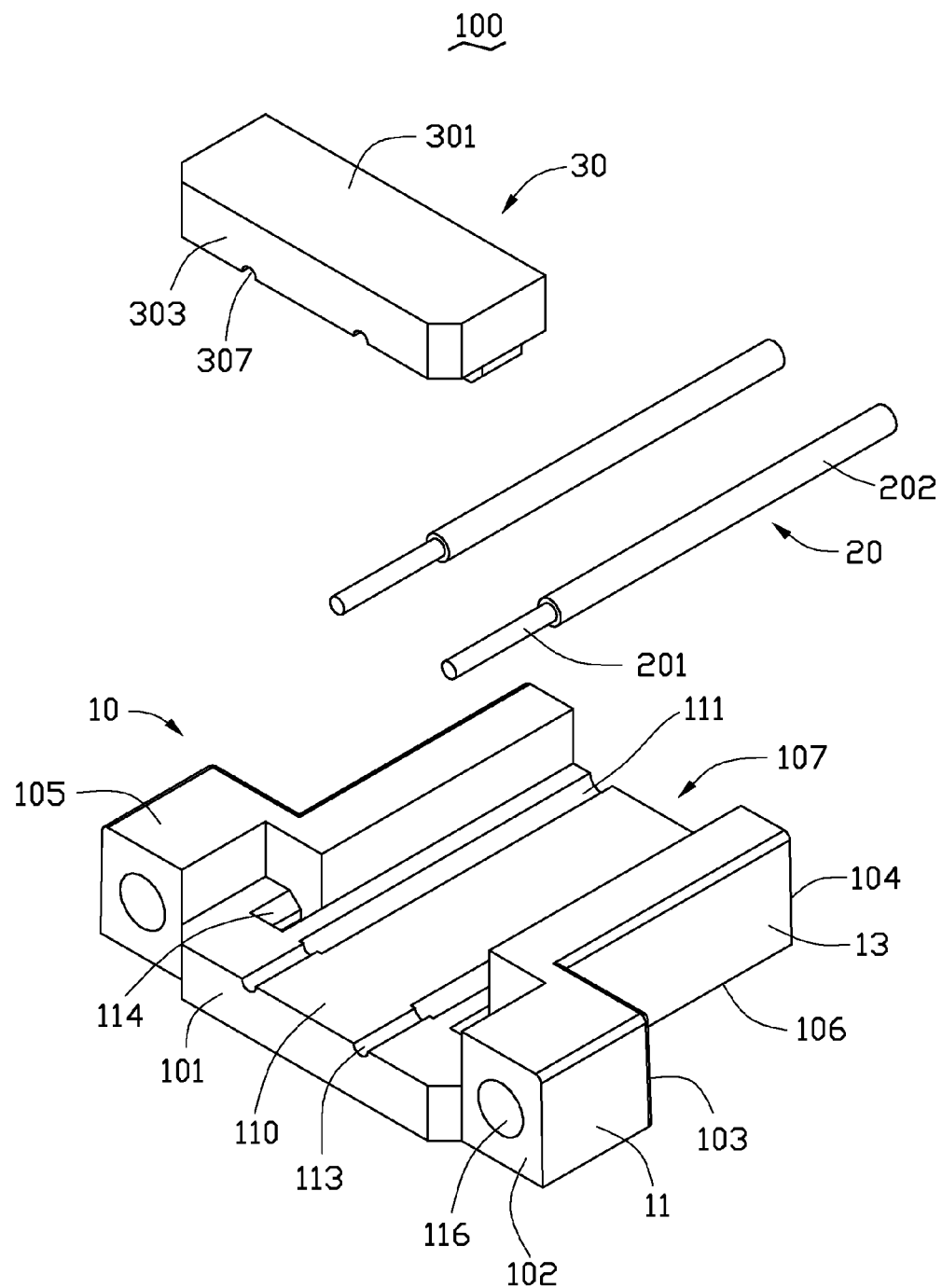
FIG. 2 is an exploded view of the optical fiber connector of FIG. 1.
Figure 3:
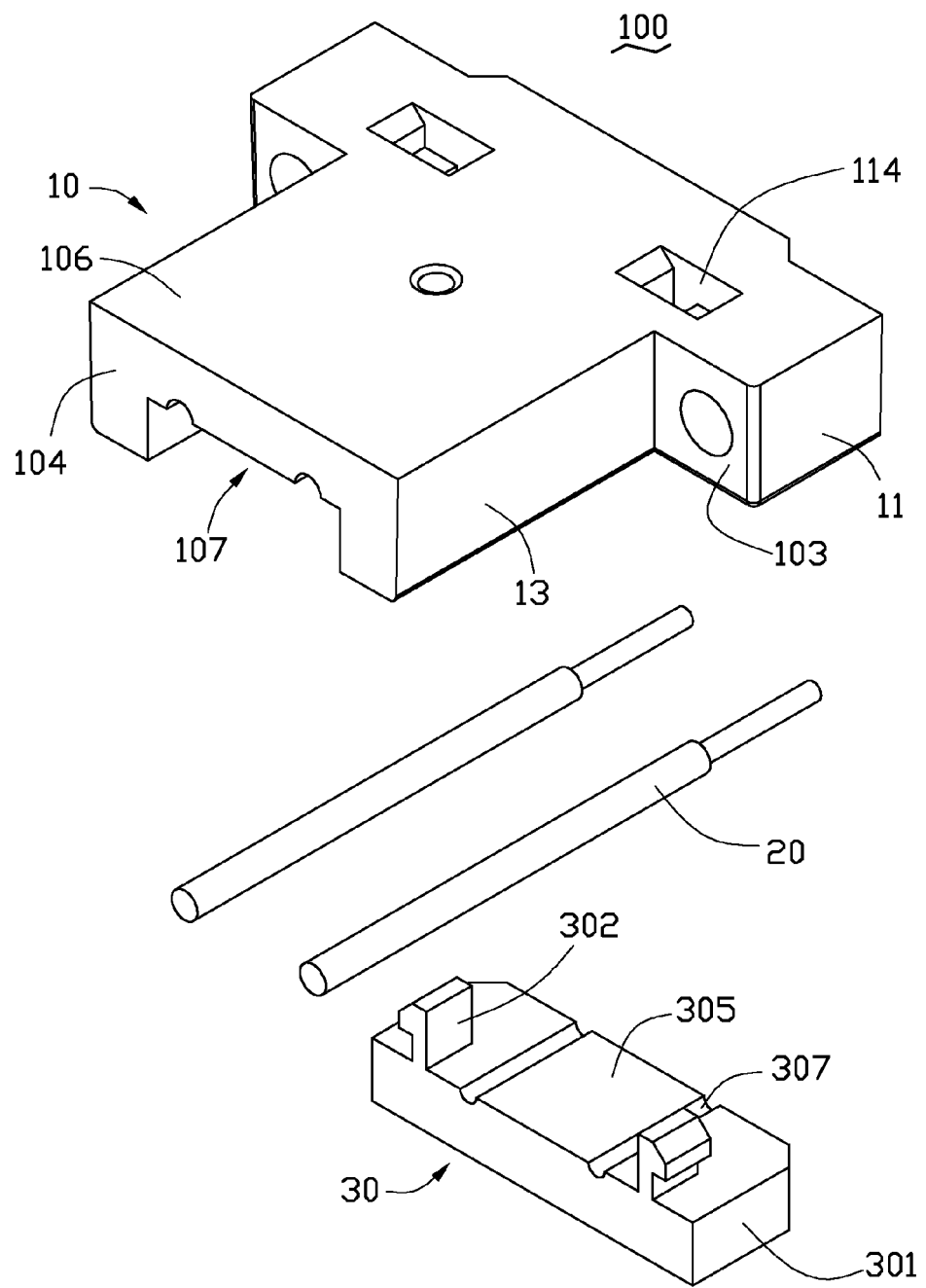
FIG. 3 is similar to FIG. 2, but viewed from another respect.

FIGS. 1 through 3 show an embodiment of an optical fiber connector 100. The optical fiber connector 100 includes a housing 10 and a clamping element 30. The optical fiber connector 100 receives optical fibers 20.

The housing 10 is transparent and substantially T-shaped. The housing 10 includes a head part 11 and a tail part 13 extending substantially perpendicularly from the head part 11. The head part 11 and the tail part 13 are both substantially cubic. The head part 11 includes a first front surface 101, a second front surface 102, and a first back surface 103. The tail part 13 extends from a substantially middle portion of the first back surface 103. The tail part 13 includes a second back surface 104. The head part 11 and the tail part 13 share a common top surface 105 and a common first bottom surface 106. The first front surface 101, the second front surface 102, the first back surface 103, and the second back surface 104 are substantially parallel to each other. A distance between the first front surface 101 and the second back surface 104 is more than a distance between the second front surface 102 and the second back surface 104. A distance between the first front surface 101 and the second back surface 104 is more than a distance between the first back surface 103 and the second back surface 104. The top surface 105 and the first bottom surface 106 are substantially parallel to each other and substantially perpendicular to the first front surface 101, the second front surface 102, the first back surface 103, and the second back surface 104.

The housing 10 defines a receiving space 107 in the top surface 105. The top surface 105 extends from the first front surface 101 to the second back surface 104. The receiving space 107 is substantially T-shaped. The housing 10 further includes an inner bottom surface 110 at a bottom of the receiving space 107. The inner bottom surface 110 is substantially parallel to the top surface 105. The housing 10 defines grooves 111 in the inner bottom surface 110. The grooves 111 extend from the second back surface 104. The housing 10 further defines receiving grooves 113 in the inner bottom surface 110. The receiving grooves 113 extend from the first front surface 101. The receiving grooves 113 are aligned with and communicate with the grooves 111. In this embodiment, a cross-sectional view of the groove 111 is substantially semi-circular, and a cross-sectional view of the receiving groove 113 is substantially semi-circular. A radius of the receiving groove 113 is smaller than a radius of the groove 111. The receiving grooves 113 and the grooves 111 receive the optical fibers 20.

Figure 4:
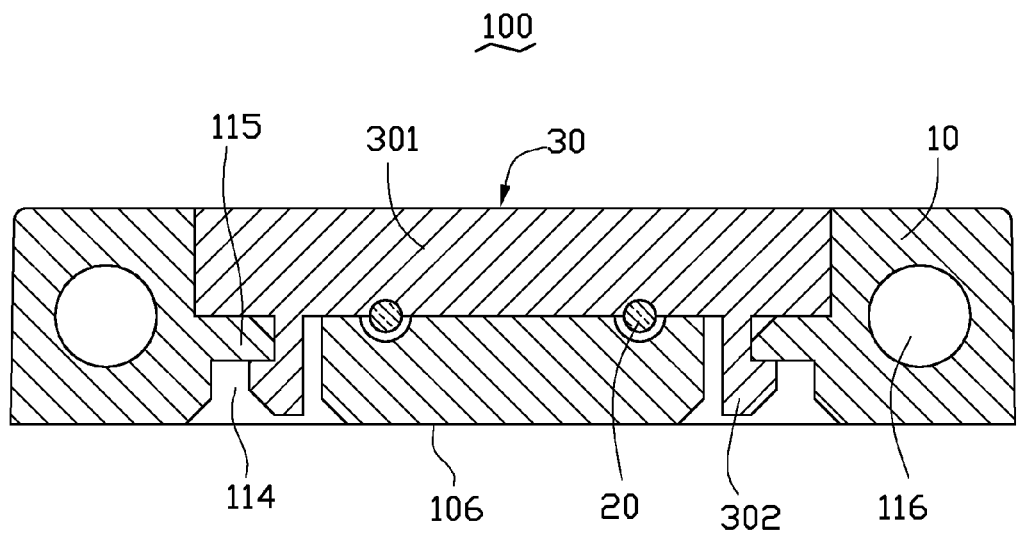
FIG. 4 is a cross-sectional view taken along line IV-IV of FIG. 1.

FIGS. 2 through 4 show that the housing 10 defines clamping holes 114 extending through the inner bottom surface 110 and the first bottom surface 106. Each clamping hole 114 is defined adjacent to a side of a corresponding groove 111 away from the other groove 111. The clamping holes 114 are defined adjacent to a boundary between the receiving grooves 113 and the grooves 111. A wedge 115 projects into each clamping hole 114. The clamping holes 114 and the wedges 115 cooperate with the clamping element 30 to fix the optical fibers 20 in the grooves 111.

The housing 10 further includes a positioning structure 116 for connecting to other optical fiber connectors. In the illustrated embodiment, the positioning structure 116 is a positioning hole defined through the second front surface 102 and the first back surface 103. In other embodiments, the positioning structure 116 can be a positioning rod.

Figure 5:
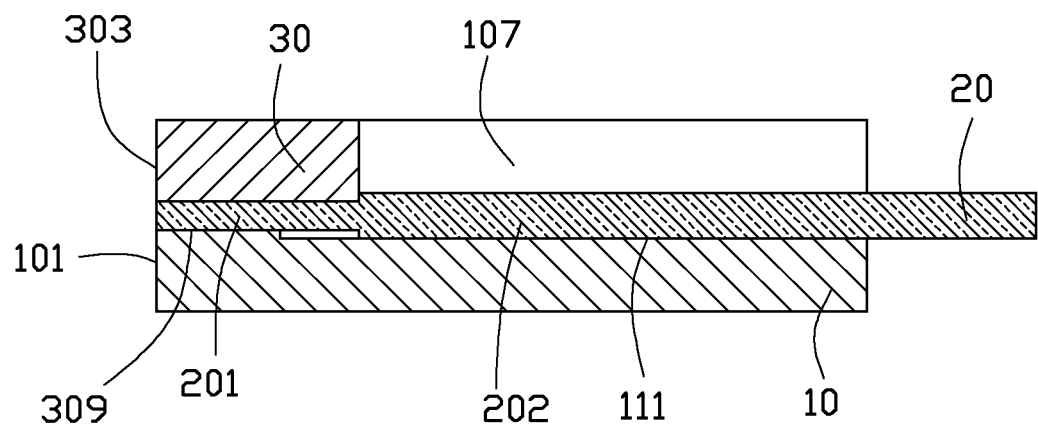
FIG. 5 is a cross-sectional view taken along line V-V of FIG. 1.

FIG. 5 shows that each optical fiber 20 includes a core fiber 201 and a cover layer 202 covering the core fiber 201. An end portion of the core fiber 201 is exposed and not covered by the cover layer 202. A diameter of the core fiber 201 is slightly smaller than a diameter of the receiving groove 113. A diameter of the cover layer 202 is slightly smaller than a diameter of the groove 111. The cover layer 202 is received in the groove 111. The exposed core fiber 201 is received in the receiving groove 113.

FIGS. 2 and 3 show that the clamping element 30 includes a cantilever beam 301, which includes two hooks 302 extending substantially perpendicularly from the cantilever beam 301. The cantilever beam 301 includes a third front surface 303 and a second bottom surface 305 substantially perpendicular to the third front surface 303. The second bottom surface 305 defines receiving grooves 307 spatially corresponding to the receiving grooves 113. A size and shape of the receiving groove 307 is substantially the same as a size and shape of the receiving groove 113. FIG. 5 shows that when the clamping element 30 is attached to the housing 10, the third front surface 303 is substantially coplanar with the first front surface 101, and the receiving grooves 113, 307 cooperatively define receiving holes 309 for receiving the optical fibers 20. A radius of the receiving hole 309 is smaller than the radius of the groove 111. The receiving holes 309 open through the first front surface 101 and the third front surface 303.

FIG. 4 shows that the hooks 302 are received in the clamping holes 114 and hook the wedges 115 to fix the clamping element 30 to the housing 10. The cantilever beam 301 presses the optical fibers 20 in the grooves 111 and the receiving holes 309. As the hooks 302 are elastically deformed when being received into the clamping holes 114, the clamping element 30 is made of durable material, such as polycarbonate.

As the optical fibers 20 are fixed in the housing 10 by the clamping element 30, if the optical fibers 20 become damaged, it is easy to detach the clamping element 30 from the housing 10 and replace the optical fibers 20.

Furthermore, as the receiving grooves 113, 307 are exposed after detaching the clamping element 30 from the housing 10, thus the receiving grooves 113, 307 are easy to clean.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. An optical fiber connector for receiving optical fibers, comprising:
    a housing comprising a top surface and an inner bottom surface, and defining a receiving space extending from the top surface, a plurality of first grooves, a plurality of first receiving grooves, and two clamping holes extending from the inner bottom surface, the first receiving grooves being aligned with the first grooves, the inner bottom surface being adjacent to the receiving space; and
    a clamping element received in the receiving space, and comprising a cantilever beam and two hooks extending from the cantilever beam, the cantilever beam comprising a bottom surface, the bottom surface defining a plurality of second receiving grooves corresponding to the first receiving grooves, the two hooks inserted into the two clamping holes to fix the clamping element on the housing, the first receiving grooves and the second receiving grooves cooperatively forming receiving holes, the receiving holes and the first grooves receiving the optical fibers.

2. The optical fiber connector of claim 1, wherein the housing further comprises two wedges projected in the two clamping holes and hooking the two hooks.

3. The optical fiber connector of claim 1, wherein the clamping element is made of polycarbonate.

4. The optical fiber connector of claim 1, wherein the housing further comprises a first front surface connected to the top surface, the cantilever beam further comprises a third front surface connected to the bottom surface, the first front surface is coplanar with the third front surface, the receiving holes extends through the first front surface and the third front surface.

5. The optical fiber connector of claim 1, wherein the optical fibers comprise a plurality of core fibers and a plurality of cover layers covering the core fibers, the core fibers comprises a plurality of exposed ends, the cover layers are received in the first grooves, the exposed ends are received in the receiving holes.

6. The optical fiber connector of claim 1, wherein the housing further comprises a positioning structure.

7. The optical fiber connector of claim 6, wherein the positioning structure is a positioning hole.

8. The optical fiber connector of claim 1, wherein the housing is transparent.

* * * * *